(12) United States Patent
Herzog et al.

(10) Patent No.: US 10,730,234 B2
(45) Date of Patent: Aug. 4, 2020

(54) APPARATUS FOR ADDITIVELY MANUFACTURING OF THREE-DIMENSIONAL COMPONENTS

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Peter Pontiller-Schymura, Neudrossenfeld (DE)

(73) Assignee: Concept Laser GmbH, Lichtenfels (DE)

( * ) Notice: Subject to any disclaimer, the term of this patent is extended or adjusted under 35 U.S.C. 154(b) by 211 days.

(21) Appl. No.: 15/703,610

(22) Filed: Sep. 13, 2017

(65) Prior Publication Data

US 2018/0104892 A1    Apr. 19, 2018

(30) Foreign Application Priority Data

Oct. 18, 2016   (DE) .................. 10 2016 119 849

(51) Int. Cl.
*B29C 64/357*    (2017.01)
*B29C 64/153*    (2017.01)
(Continued)

(52) U.S. Cl.
CPC .............. *B29C 64/153* (2017.08); *B07B 7/01* (2013.01); *B07B 7/04* (2013.01); *B22F 3/1055* (2013.01);
(Continued)

(58) Field of Classification Search
CPC .... B07B 7/08; B07B 7/01; B07B 7/04; B29C 64/10; B29C 64/20; B29C 64/153;
(Continued)

(56) References Cited

U.S. PATENT DOCUMENTS

| | | | |
|---|---|---|---|
| 2005/0155912 A1* | 7/2005 | Carvagno | ................. B07B 4/02 209/143 |
| 2012/0231232 A1 | 9/2012 | Xu et al. | |

(Continued)

FOREIGN PATENT DOCUMENTS

| | | |
|---|---|---|
| CN | 103547630 B | 12/2016 |
| DE | 102012014838 A1 | 1/2014 |

(Continued)

OTHER PUBLICATIONS

European Search Opinion Corresponding to Application No. 17174398.2.

(Continued)

*Primary Examiner* — Jacob T Minskey
*Assistant Examiner* — Cedrick S Williams
(74) *Attorney, Agent, or Firm* — Dority & Manning, P.A.

(57) ABSTRACT

An apparatus for additive manufacturing of three-dimensional components by successive, selective layer-by-layer exposure. Solidifying construction material layers of a construction material can be solidified by means of an energy beam in a process chamber, wherein the process chamber can be flown through or is flown through by an, especially inert, gas flow generated by a flow generation device, wherein with the gas flow and construction material particles resulting a particle mixture can be formed or is formed, wherein the particle mixture includes at least three construction material fractions differing in at least one construction material particle parameter, especially particle size and/or particle density, comprising a separation device, which is provided for separating the respective construction material particle fractions from the particle mixture by means of visual inspection, wherein the separation device comprises at least three separation sections each serving the separation of a certain construction material particle fraction.

16 Claims, 4 Drawing Sheets

(51) Int. Cl.
  *B22F 3/105* (2006.01)
  *B07B 7/01* (2006.01)
  *B07B 7/04* (2006.01)
  *B33Y 10/00* (2015.01)
  *B33Y 30/00* (2015.01)

(52) U.S. Cl.
  CPC .......... *B29C 64/357* (2017.08); *B33Y 10/00* (2014.12); *B33Y 30/00* (2014.12)

(58) Field of Classification Search
  CPC ..... B29C 64/205; B29C 64/30; B29C 64/364; B29C 64/393
  See application file for complete search history.

(56) References Cited

U.S. PATENT DOCUMENTS

| | | | | |
|---|---|---|---|---|
| 2016/0059310 | A1* | 3/2016 | Junker | B01D 50/008 419/53 |
| 2016/0193696 | A1* | 7/2016 | McFarland | B22F 3/1055 |
| 2016/0318072 | A1 | 11/2016 | Martin et al. | |
| 2017/0348771 | A1* | 12/2017 | Kawada | B33Y 30/00 |

FOREIGN PATENT DOCUMENTS

| | | |
|---|---|---|
| DE | 102013000511 A1 | 7/2014 |
| DE | 102014207160 A1 | 10/2015 |
| EP | 1316408 A1 | 6/2003 |
| EP | 2992942 A1 | 3/2016 |
| JP | 2016/052778 A | 4/2016 |
| WO | 2015109091 A1 | 7/2015 |

OTHER PUBLICATIONS

European Search Report Corresponding to Application No. 17174398 dated Nov. 9, 2017.
German Search Results Corresponding to Application No. 102016119849.8 dated Nov. 15, 2018.
Japanese Office Action Corresponding to Application No. 2017162345 dated Nov. 26, 2018.
Chinese Office Action Corresponding to Application No. 2017106477094 dated Apr. 12, 2019.
Japanese Office Action Corresponding to Application No. 2017162345 dated Aug. 14, 2019.

* cited by examiner

APPARATUS FOR ADDITIVELY MANUFACTURING OF THREE-DIMENSIONAL COMPONENTS

CROSS-REFERENCE TO RELATED APPLICATIONS

This application claims priority to German Patent Application serial no. 10 2016 119 849.9 filed Oct. 18, 2016, the contents of which is incorporated herein by reference in its entirety as if set forth verbatim.

BRIEF DESCRIPTION OF THE DRAWINGS

Exemplary embodiments of the present disclosure are described with reference to the Figures, in which.

DETAILED DESCRIPTION

Figure 1:
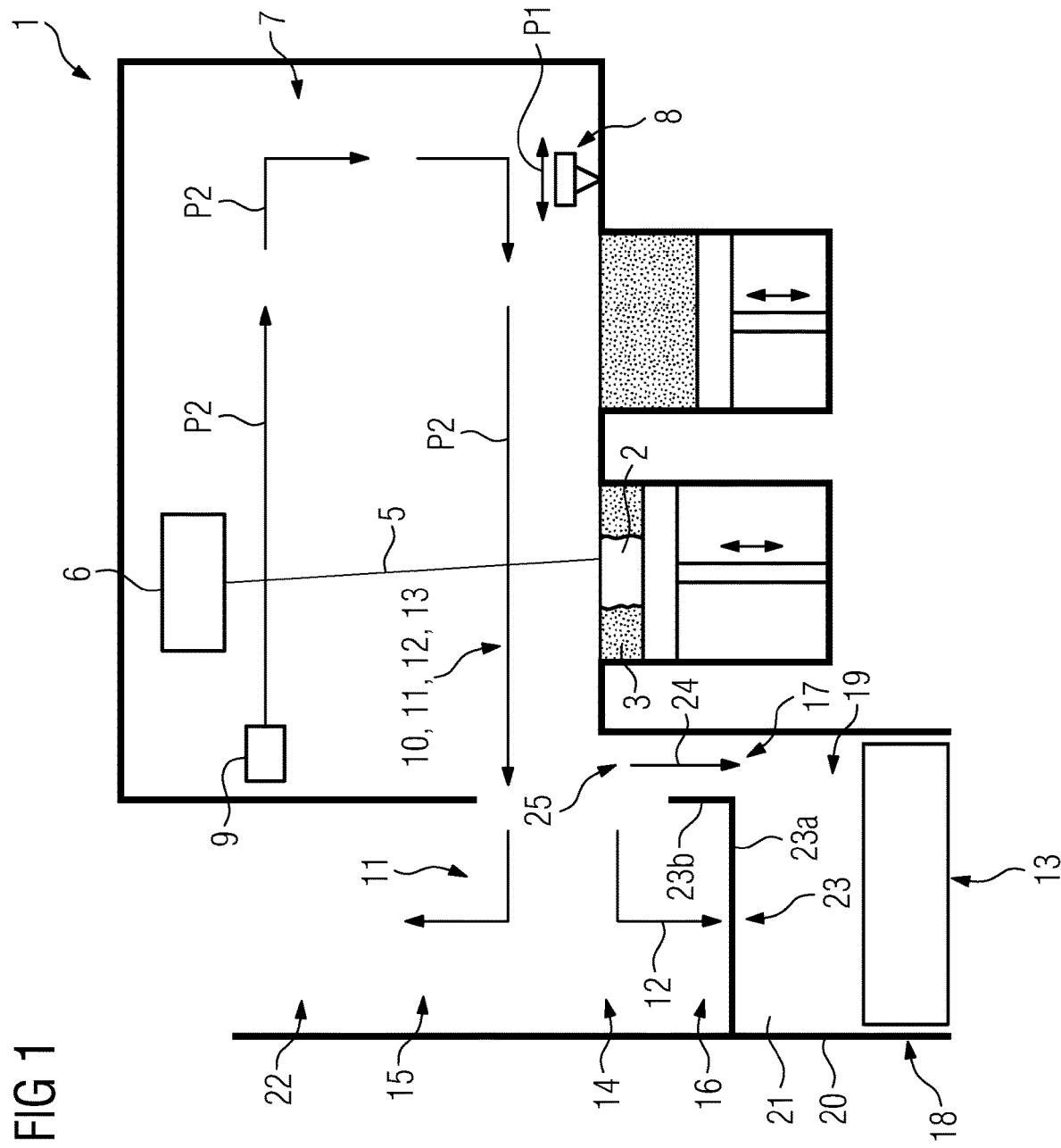
FIGS. 1-4 each show a schematic diagram of an apparatus according to an exemplary embodiment.

The invention relates to an apparatus for additive manufacturing of three-dimensional components by successive, selective layer-by-layer exposure and thus solidifying construction material layers of a construction material that can be solidified by means of an energy beam in a process chamber, wherein the process chamber can be flown through or is flown through by an, especially inert, gas flow generated by a flow generation device, wherein with the gas flow and construction material particles resulting related to the process a particle mixture can be formed or is formed, wherein the particle mixture includes at least three construction material fractions differing in at least one construction material particle parameter, especially particle size and/or particle density.

The formation of respective particle mixtures including several construction material particle fractions differing in at least one construction material particle parameter is per se known in connection with the additive manufacturing of three-dimensional components. It is further known to separate the construction material particles contained in respective particle mixtures from the respective particle mixtures, to at least partially reuse them.

Particularly small construction material particles ("smoke particles") remaining in the particle mixture related to their mass are typically separated by filtering the particle mixture. Larger construction material particles not remaining in the particle mixture related to their mass are subjected to sieving. The sieving enables a separation of particularly large construction material particles ("oversize particles"). By means of sieving it is, however, so far not, anyway not satisfyingly, possible to separate construction material particles resulting related to the process, which differ from the particles of the starting construction material, with a particle size between the smoke particles and the oversize particles. Reusing said construction material particles can impair the structural properties of components additively manufactured.

It is an object of the invention to indicate an improved apparatus for additive manufacturing of three-dimensional components in terms of a separation of construction material particles that differ from the particles of an (original) starting construction material, having a particle size between the smoke particles and the oversize particles.

The object is solved by an apparatus according to claim 1. The dependent claims relate to possible embodiments of the apparatus. The object is further solved by a method according to claim 11.

The apparatus described herein ("apparatus") serves the additive manufacturing of three-dimensional components, i.e. for example technical components or technical component groups, respectively, by successive, selective layer-by-layer exposure and thus solidifying construction material layers of a construction material that can be solidified by an energy beam. Additive construction processes performed by means of the apparatus are carried out in an inertable process chamber associated with the apparatus. The process chamber can form a part of a housing structure of the apparatus.

The apparatus can be an SLM apparatus, i.e. an apparatus for performing selective laser melting methods (SLM methods), or an SLS apparatus, i.e. an apparatus for performing selective laser sintering methods (SLS methods or Laser-CUSING® methods). The selective solidification of respective construction material layers to be selectively solidified is carried out based on component-related construction data. Respective construction data describe the geometric structural design of the respective component to be additively manufactured and can for example include "sliced" CAD data of a respective component to be additively manufactured.

The apparatus comprises the functional components typically required for performing additive construction processes, i.e. especially an energy beam generation device for generating an energy beam, i.e. especially a laser beam, for the successive, selective layer-by-layer solidification of individual construction material layers of a construction material, i.e. especially a particulate or powdered metal, plastic and/or ceramic material, and a coating device for forming construction material layers to be solidified in a construction plane. A construction plane can be a surface of a carrying element, which typically is movably supported (in vertical direction), of a carrying device, or a construction material layer. In general, in a construction plane at least one construction material layer that is to be selectively solidified or that is selectively solidified is arranged or formed.

Another functional component of the apparatus is a flow generation device. The flow generation device, which can e.g. be a blower and/or a suction device, is provided for generating a gas flow flowing through the process chamber. The gas flow is formed by a typically inert flow gas, i.e. for example argon or nitrogen. According to this, the process chamber can be flown through or is flown through by an, especially inert, gas flow generated by a flow generation device. With the gas flow flowing through the process chamber and construction material particles resulting related to the process, typically non-solidified, a particle mixture, i.e. especially a gas particle mixture, is formed, which includes at least three construction material particle fractions differing in at least one construction material particle parameter, especially particle size or particle density. The construction material particles resulting related to the process are typically so-called "smoke" or "welding or sintering splashes". The smoke or the welding or sintering splashes, respectively, comprise a very large range of differently large and/or dense construction material particles and thus different construction material particle fractions. The construction material particles can thus be divided into the construction material particle fractions that are described in more detail in the following.

The apparatus further comprises a separation device. The separation device is provided for separating the respective construction material particle fractions from the particle mixture by means of visual inspection or inspecting. Visual inspection or inspecting is understood to mean a classification of construction material particles according to certain construction material particle parameters, such as e.g. particle size, density, inertance and the suspension or layering behavior resulting from that. In this respect, the separation device can also be referred to or considered as visual inspection device. The separation device comprises at least three separation sections each serving the separation of a certain construction material particle fraction. Each separation section is thus assigned to a certain construction material particle fraction that can be separated from the particle mixture using the respective separation section. The separation of the respective construction material particle fraction from the particle mixture is carried out by means of the separation device such that the particle mixture included in construction material particle fractions to be separated in respective separation sections flows through the separation device, and that the construction material particles to be assigned to the individual construction material particle fractions due to their different construction material particle parameters, especially with their different particle size or density or the different suspension or layering behavior resulting therefrom can be separated in the respective separation sections. Typically, the construction material particle fraction with the largest or most dense construction material particles is separated first, then the construction material particle fraction with the second largest or second most dense construction material particles is separated and then the construction material particle fraction with the third largest or third most dense construction material particles is separated.

A first separation section typically serves the separation of a first construction material particle fraction. The first construction material particle fraction (significantly) includes construction material particles with a particle size or particle density that is in terms of a particle distribution defined by a lower and an upper limit particle size or limit particle density lying below the lower limit particle size or lying below the lower limit particle density. The first construction material particle fraction includes especially the smoke particles.

A second separation section typically serves the separation of a second construction material particle fraction. The second construction material particle fraction (significantly) includes construction material particles with a particle size or particle density that is in terms of a particle distribution defined by a lower and an upper limit particle size or a lower and an upper limit particle density lying between the lower and the upper limit particle size or between the lower and the upper limit particle density. The second construction material particle fraction includes especially the, typically already partially molten, undersize particles.

A third separation section serves the separation of a third construction material particle fraction. The third construction material particle fraction (significantly) includes construction material particles with a particle size or particle density that is in terms of a particle size distribution defined by a lower and an upper limit particle size or a lower and an upper particle density lying above the upper limit particle size or above the upper limit particle density. The third construction material particle fraction includes especially the, typically already partially molten, oversize particles.

The terms "undersize particles" and "oversize particles" refer to a sieving process usual until now, in which the construction material particles (undersize particles) of the second construction material particle fraction were separated from the construction material particles (oversize particles) of the third construction material particle fraction.

A specific particle size distribution of a respective construction material is to be determined or is determined depending on the respective construction material. An exemplary particle size distribution of an exemplary construction material includes construction material particles having a particle size between 10 and 45 or 50 µm. The particle size distribution is thus defined by a lower limit particle size of 10 µm and an upper limit particle size of 45 or 50 µm. For such a particle size distribution, the first construction material particle fraction includes construction material particles having a particle size below 10 µm, the second construction material particle fraction includes construction material particles having a particle size between 10 µm and 45 or 50 µm, and the third construction material particle fraction includes construction material particles having a particle size above 45 or 50 µm.

By the described fractioned separation of the individual construction material particle fraction from a respective particle mixture an improved apparatus is realized. The problem described in connection with prior art illustrated at the beginning, whereby it was until now not, anyway not satisfactorily, possible by means of sieving to separate construction material particles having a particle size or density between the smoke particles and the oversize particles, which differ from the particles of an (original) starting construction material and thus deviate from the starting material in their properties, is thus addressed. Construction material particles having a particle size between the smoke particles and the oversize particles, i.e. construction material particles of the second construction material particle fraction, can specifically be separated, and reusing said construction material particles (fraction) can be excluded.

The separation device or the separation sections associated with that, as resulting in the following, especially the second and third separation sections, can be arranged or formed in a powder module. The powder module comprises a powder chamber. The powder chamber comprises a powder chamber room defined by powder chamber walls. Specifically, the powder chamber room is at least laterally limited by powder chamber walls of the powder chamber generally formed like a hollow parallelepiped or like a hollow cylinder. At the bottom, the powder chamber room is typically limited by a carrying device. The carrying device can be a powder chamber plate or a powder chamber table having stored thereon such a plate. The carrying device is typically movably supported between two end positions, i.e. between an upper end position (related to the height of the powder module) and a lower end position, relative to the powder chamber; the movable support of the carrying device is typically realized by an especially (electro) motor operated drive or actuator device coupled with the carrying device.

The powder module can especially be a collector or overflow module, which when performing additive manufacturing processes can be filled with non-solidified construction material.

A or the first separation section, which serves the separation of the or a first construction material particle fraction from the particle mixture, can comprise a flow portion that can be or is, especially vertically, flown through, by a gas flow. The flow portion can form e.g. a flow channel vertically oriented. The flow portion communicates (directly or indirectly, i.e. by interconnection of at least one other flow element defining a flow portion) with a filter device that is downstream of the portion and typically also forming a functional component of the apparatus. The filter device is provided for separating the construction material particles of the first construction material particle fraction contained in the gas flow from the gas flow by means of filtering. The first separation section is typically arranged or formed within the process chamber extending at least partially, e.g. vertically, through the process chamber. The first separation section is typically arranged or formed above the second separation section. The construction material particles that in the first separation section can be separated from the particle mixture—this typically is a gas flow resulting from the particle mixture, from which the already second and third construction material particle fraction was separated by means of the remaining separation sections—are typically smoke particles, which are separated from the gas flow by means of the filter device.

A or the second separation section, which serves the separation of the or a second construction material particle fraction from the particle mixture, can comprise a separation element that is arranged or formed especially within the powder module, i.e. within the powder chamber room. Typically, the separation element defines an upper powder chamber (sub) room lying above said element and a lower powder chamber (sub) room lying below said element.

The separation element can have a plate-like or plate-shaped geometric structural design. Next to (geometrically) even or plane designs also (geometrically) curved or multi-legged angled, i.e. for example L-, U-, or V-shaped angled, designs defining a collecting section for construction material particles of the second construction material particle fraction to be separated are conceivable.

For the example of a separation element with a, cross-sectionally seen, L-shaped—the term "L-shaped" of course also includes certain geometric variations of an "L"-angled geometrical structural design especially the following applies: The long leg of the "L" is (significantly) horizontally oriented and extends from a first powder chamber wall towards a second powder chamber wall that is arranged opposite said first wall. The short leg of the "L" is (significantly) vertically oriented. Overall, it is a "lying L". With the two legs of the "L" and the first powder chamber wall a (pocket-like) collecting section for construction material particles of the second construction material particle fraction to be separated is defined.

For the example of a separation element with a, cross-sectionally seen, U-shaped—the term "U-shaped" of course also includes certain geometric variations of a "U"-angled geometrical structural design especially the following applies: The two long legs of the "U" are (significantly) vertically oriented, wherein a first long leg of the "U" adjacent to a first powder chamber wall extends parallel to that or is formed by the first powder chamber wall, and a second long leg of the "U" adjacent to a second powder chamber wall arranged opposite the first powder chamber wall extends parallel to that. The short leg of the "U" is (significantly) vertically oriented and extends from the first powder chamber wall towards the second powder chamber wall that is arranged opposite that first wall. Overall, it is a "U open towards the top". With the legs of the "U" a (pocket-like) collecting section for construction material particles of the second construction material particle fraction to be separated is defined. An analogous geometric structural design results for a separation element with a cross-sectionally seen V-shaped angled design.

A or the third separation section for separating a third construction material particle fraction is typically arranged or formed below the second separation section. As mentioned, the separation element defines an upper powder chamber (sub) room lying above said element and a lower powder chamber (sub) room lying below said element; the third separation section is typically arranged or formed in the lower powder chamber (sub) room located below the separation element.

In order to create an access opportunity into the third separation section, between the separation element forming the second separation section and a powder chamber wall (opposite said element) a gap is defined that forms an access opportunity into the third separation section.

The separation element can be movably supported in at least one, especially linear, freedom degree of motion relative to the powder chamber wall and/or relative to a bottom of the powder chamber, formed especially by a carrying device, wherein the gap, especially the inner span (horizontal extension) and/or length (vertical extension) thereof, can be varied by movements of the separation element relative to the powder chamber wall and/or the bottom of the powder chamber. Consequently, the separation device can be adjusted by varying the gap to different construction material particle fractions or to different particle mixtures including different construction material particle fractions. Movements of the separation element can be realized by an, especially (electric) motor operated, drive device coupled with said element. Movements of the separation element can for example be sliding motions along an, especially horizontal, trajectory, or swiveling movements around a swiveling axis, especially horizontally oriented.

Independent from the specific geometric structural design of respective separation sections the third separation section, especially the gap forming an access opportunity into the third separation section, can be connected upstream of the second separation section in gas downstream direction, and the second separation section can be connected upstream of the first separation section in gas downstream direction. The particle mixture flowing through the separation device thus at first passes the third separation section, in which a separation of the third construction material particle fraction is carried out, or the gap forming an access opportunity into the third separation section, then passes the second separation section, in which a separation of the second construction material particle fraction is carried out, and then passes the first separation section, in which a separation of the first construction material particle fraction is carried out.

The apparatus can comprise an additional flow generation device. The additional flow generation device is provided for generating a transport flow influencing the flow of the second construction material particle fraction towards the second separation section, especially over the gap. With the additional flow generation device the flow, especially the flow rate, of the particle mixture flowing through the separation device can specifically be affected. By a specific impact of the flow of the particle mixture, the separation of respective construction material particle fractions can in turn specifically be impacted. For example, certain construction material particles, which without impact of the flow of the particle mixture would be separated in the third separation section, can be separated in the second separation section by impacting the flow of the particle mixture. The flow generation device typically comprises at least one, especially nozzle-like, flow generation element, by which a, typically inert, additional protective gas flow can be generated.

The invention further relates to a method for additive manufacturing of three-dimensional components by successive, selective layer-by-layer exposure and thus solidifying construction material layers of a construction material that can be solidified by means of an energy beam in a process chamber, wherein the process chamber is flown through by an, especially inert, gas flow generated by a flow generation device, wherein with the gas flow and construction material particles resulting related to the process a particle mixture is formed, wherein the particle mixture includes several, especially at least three, construction material fractions differing in at least one construction material particle parameter, especially particle size and/or particle density. The method is characterized in that for the separation of the respective construction material particle fractions from the particle mixture a separation device is used, which is provided for separating the respective construction material particle fractions from the particle mixture by means of visual inspection, wherein the separation device comprises several, especially at least three, separation sections each serving the separation of a certain construction material particle fraction. Consequently, all explanations in connection with the apparatus analogously apply to the method.

The invention is explained in more detail by means of exemplary embodiments in the figures of the drawings. In which:

FIGS. 1-4 each show a schematic diagram of an apparatus according to an exemplary embodiment.

FIG. 1 shows a schematic diagram of an apparatus 1 according to an exemplary embodiment. The apparatus 1 serves the additive manufacturing of three-dimensional components 2, i.e. for example technical components or technical component groups, respectively, by successive, selective layer-by-layer exposure and thus solidifying construction material layers of a construction material 3 that can be solidified by means of an energy beam 5 generated by an energy beam generation device 4. The apparatus 1 can especially be an SLM apparatus, i.e. an apparatus for performing selective laser melting methods (SLM methods). The energy beam 5 is thus especially a laser beam and the construction material 3 especially a particulate or powdered metal such as for example aluminum, stainless steel or titanium. The selective solidification of respective construction material layers to be solidified is carried out based on component-related construction data. Respective construction data describe the geometric or geometric structural design of the respective component 2 to be additively manufactured. Respective construction data can for example include "sliced" CAD data of the component 2 to be manufactured.

The apparatus 1 comprises an inertable process chamber 7. The process chamber 7 can form a part of a housing structure (not denoted in more detail) of the apparatus 1. In the process chamber 7 the functional components required for performing additive construction processes, i.e. especially the energy beam generation device 4 and a coating device 8 that is movably supported as indicated by the horizontally oriented double arrow P1, are arranged or formed for forming construction material layers in a construction plane to be solidified.

Another functional component of the apparatus 1 is a flow generation device 9 in the form of a blower and/or suction device. The flow generation device 9 is provided for generating a gas flow as indicated by arrows P2 flowing through the process chamber 7. The gas flow is formed by an inert flow gas, i.e. for example argon or nitrogen. The process chamber 7 is thus flown through by the inert gas flow generated by the flow generation device 9. With the gas flow and non-solidified construction material particles resulting related to the process, typically, a particle mixture 10 is formed, which includes at least three construction material fractions 11, 12, 13 differing in at least one construction material particle parameter, especially particle size and/or particle density. The construction material particles resulting related to the process are typically so-called "smoke" or "welding or sintering splashes". The smoke or the welding or sintering splashes comprise a very large range of differently large or dense construction material particles and thus different construction material particle fractions.

The apparatus 1 further comprises a separation device 14. The separation device 14 is provided for separating the respective construction material particle fractions 11-13 from the particle mixture 10 using visual inspection or inspecting. The separation device 14 comprises three separation sections 15-17 each serving the separation of a certain construction material particle fraction 11-13. Each separation section 15-17 is thus assigned to a certain construction material particle fraction 11-13 that can be separated from the particle mixture 10 using the respective separation section 15-17. The separation of the respective construction material particle fraction 11-13 from the particle mixture 10 is carried out by means of the separation device 14 such that the particle mixture 10 flows through the separation device 14, and that the construction material particles to be assigned to the individual construction material particle fractions 11-13 due to their different construction material particle parameters, especially due to their different particle size or density or the different suspension or layering behavior resulting therefrom can be separated in the respective separation sections 15-17. Typically, the construction material particle fraction 13 with the largest or most dense construction material particles is separated first, then the construction material particle fraction 12 with the second largest or second most dense construction material particles is separated and then the construction material particle fraction 13 with the third largest or third most dense construction material particles is separated.

A first separation section 15 serves the separation of a first construction material particle fraction 11, which (significantly) includes construction material particles with a particle size or particle density that is in terms of a particle distribution of the construction material 3 defined by a lower and an upper limit particle size or limit particle density lying below the lower limit particle size or particle density. The first construction material particle fraction 11 includes especially the smoke particles. A second separation section 16 serves the separation of a second construction material particle fraction 12, which (significantly) includes construction material particles with a particle size or particle density that is in terms of a particle distribution of the construction material 3 defined by a lower and an upper limit particle size or limit particle density lying between the lower and the upper limit particle size or the limit particle density. The second construction material particle fraction 12 includes especially the, typically already partially molten, undersize particles. A third separation section 17 serves the separation of a third construction material particle fraction 13, which (significantly) includes construction material particles with a particle size or particle density that is in terms of a particle size distribution of the construction material 3 defined by a lower and an upper limit particle size or limit particle density lying above the upper limit particle size or the limit particle density. The third construction material particle fraction 13 includes especially the, typically already partially molten, oversize particles. The terms "undersize particles" and "oversize particles" refer to a sieving process usual until now, in which the construction material particles (undersize particles) of the second construction material particle fraction 12 were separated from the construction material particles (oversize particles) of the third construction material particle fraction 13.

For an exemplary particle size distribution of a construction material 3 having a particle size between 10 and 45 or 50 µm the following applies: The first construction material particle fraction 11 includes construction material particles having a particle size below 10 µm, the second construction material particle fraction 12 includes construction material particles having a particle size between 10 µm and 45 µm, and the third construction material particle fraction 13 includes construction material particles having a particle size above 45 µm.

The separation device 14 or the separation sections 15-17 associated with that are arranged or formed in a powder module 18. The powder module 18 is a collector or overflow module, which when performing additive manufacturing processes can be filled with non-solidified construction material 3. The powder module 18 comprises a powder chamber 19, which comprises a powder chamber room 21 defined by powder chamber walls 20. The powder chamber room 21 is at least laterally limited by the powder chamber walls 20. At the bottom, the powder chamber room 21 can be limited by a carrying device (not shown). The carrying device can be a powder chamber plate or a powder chamber table having stored thereon such a plate. The carrying device is typically movably supported between two end positions, i.e. between an upper end position (related to the height of the powder module) and a lower end position, relative to the powder chamber 19; the movable support of the carrying device is typically realized by an especially (electro) motor operated drive or actuator device coupled with the carrying device.

The first separation section 15, which serves the separation of the first construction material particle fraction 11 from the particle mixture 10, comprises a flow portion 22 flown through by a gas flow, e.g. vertical, which forms an, e.g. vertically, oriented flow channel. The flow portion 22 communicates with a filter device (not shown) that is connected downstream of that portion and is typically also forming a functional component of the apparatus 1. The filter device is provided for separating the construction material particles of the first construction material particle fraction 11 contained in the gas flow from the gas flow by means of filtering. The first separation section 15 is arranged or formed within the process chamber 7 extending at least partially, e.g. vertically, through the process chamber 7.

Apparently, the first separation section 11 is arranged above the second separation section 12. The construction material particles that can be separated from the particle mixture 10 in the first separation section 11—this is typically a gas flow resulting from the particle mixture 10, from which the second and the third construction material particle fraction 12, 13 was already separated by means of the remaining separation sections 16, 17—are typically smoke particles, which are separated from the gas flow by means of the filter device.

The second separation section 16, which serves the separation of the second construction material particle fraction 12 from the particle mixture 10, comprises a separation element 23 arranged within the powder module 18, i.e. within the powder chamber room 21. The separation element 23 defines an upper powder chamber (sub) room lying above said element and a lower powder chamber (sub) room lying below said element.

In the exemplary embodiment the separation element 23 has, cross-sectionally seen, an L-shaped angled geometric structural design. The long leg 23a of the "L" is (significantly) oriented horizontally and extends from a first (left) powder chamber wall 20 towards a second (right) powder chamber wall 20 that is arranged opposite said first wall. The short leg 23b of the "L" is (significantly) oriented vertically. Overall, it is a "lying L". With the two legs 23a, 23b of the "L" and the first powder chamber wall 20 a (pocket-like) collecting section for construction material particles of the second construction material particle fraction 12 to be separated is defined.

The third separation section 17, which is provided for separating the third construction material particle fraction 13, is arranged or formed below the second separation section 12. More specifically, the third separation section 17 is arranged or formed in the lower powder chamber (sub) room located below the separation element 23. In order to create an access opportunity into the third separation section 17, between the separation element 23, i.e. between the free end of the separation element 23 (formed by the short leg 23b) and the powder chamber wall 20 (opposite said element) a gap 24 is defined that forms an access opportunity into the third separation section 17.

From the arrangement and formation of the separation sections 15-17 described above it follows that the third separation section 17, especially the gap 24 forming an access opportunity into the third separation section 17, is connected upstream of the second separation section 16 in gas downstream direction, and the second separation section 16 is connected upstream of the first separation section 15 in gas downstream direction. The particle mixture 10 flowing through the separation device 14 thus at first passes the third separation section 17, in which a separation of the third construction material particle fraction 13 is carried out, or the gap 24 forming an access opportunity into the third separation section 17, then passes the second separation section 16, in which a separation of the second construction material particle fraction 12 is carried out, and then passes the first separation section 15, in which a separation of the first construction material particle fraction 11 is carried out.

The apparatus 1 can optionally comprise an additional flow generation device 25. The additional flow generation device 25 is provided for generating a transport flow influencing the flow of at least the second construction material particle fraction 12 towards the second separation section 12, especially over the gap 24. With the additional flow generation device 25 the flow, especially the flow rate, of the particle mixture 10 flowing through the separation device 14 can specifically be (locally) affected. By a specific impact of the flow of the particle mixture 10, the separation of respective construction material particle fractions 11-13 can in turn specifically be impacted. For example, certain construction material particles, which without impact of the flow of the particle mixture 10 would be separated in the third separation section 17, can be separated by impacting the flow of the particle mixture 10 in the second separation section 16. The additional flow generation device 25 typically comprises at least one, especially nozzle-like, flow generation element (not denoted in more detail), by which a, typically inert, additional protective gas flow can be generated.

Figure 2:
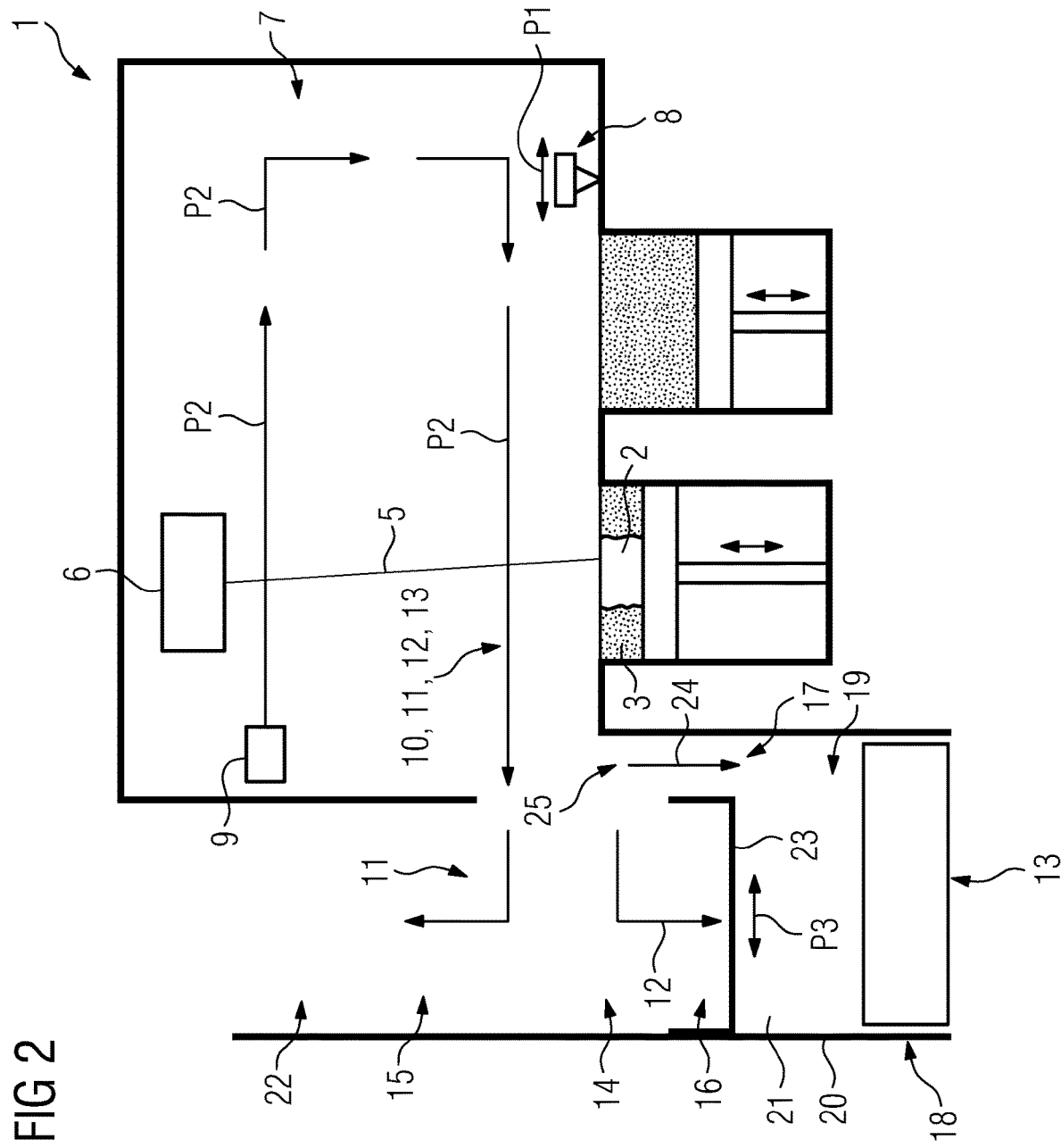

FIG. 2 shows a schematic diagram of an apparatus 1 according to another exemplary embodiment. In contrast to the exemplary embodiment according to FIG. 1, the separation element 23 is here movably supported in one, especially linear, freedom degree of motion relative to the powder chamber wall 20. Accordingly, the gap 24, especially the inner span thereof, can be varied by movements of the separation element 23 relative to the powder chamber wall 20. Consequently, the separation device 14 can be adjusted by varying the gap 24 to different construction material particle fractions 11-13 or to different particle mixtures 10 including different construction material particle fractions 11-13. Movements of the separation element 23 can for example be, as indicated by the double arrow P3, sliding movements along an, especially horizontal, trajectory. Of course, swiveling motions around an, especially horizontally oriented, swiveling axis would also be conceivable. Alternatively or complementary, the separation element could also be movably supported in an, especially linear, freedom degree of motion relative to the bottom of the powder chamber 19. Movements of the separation element 23 can in any case be realized by an, especially (electric) motor operated, drive device (not shown) coupled with said element.

Figure 3:
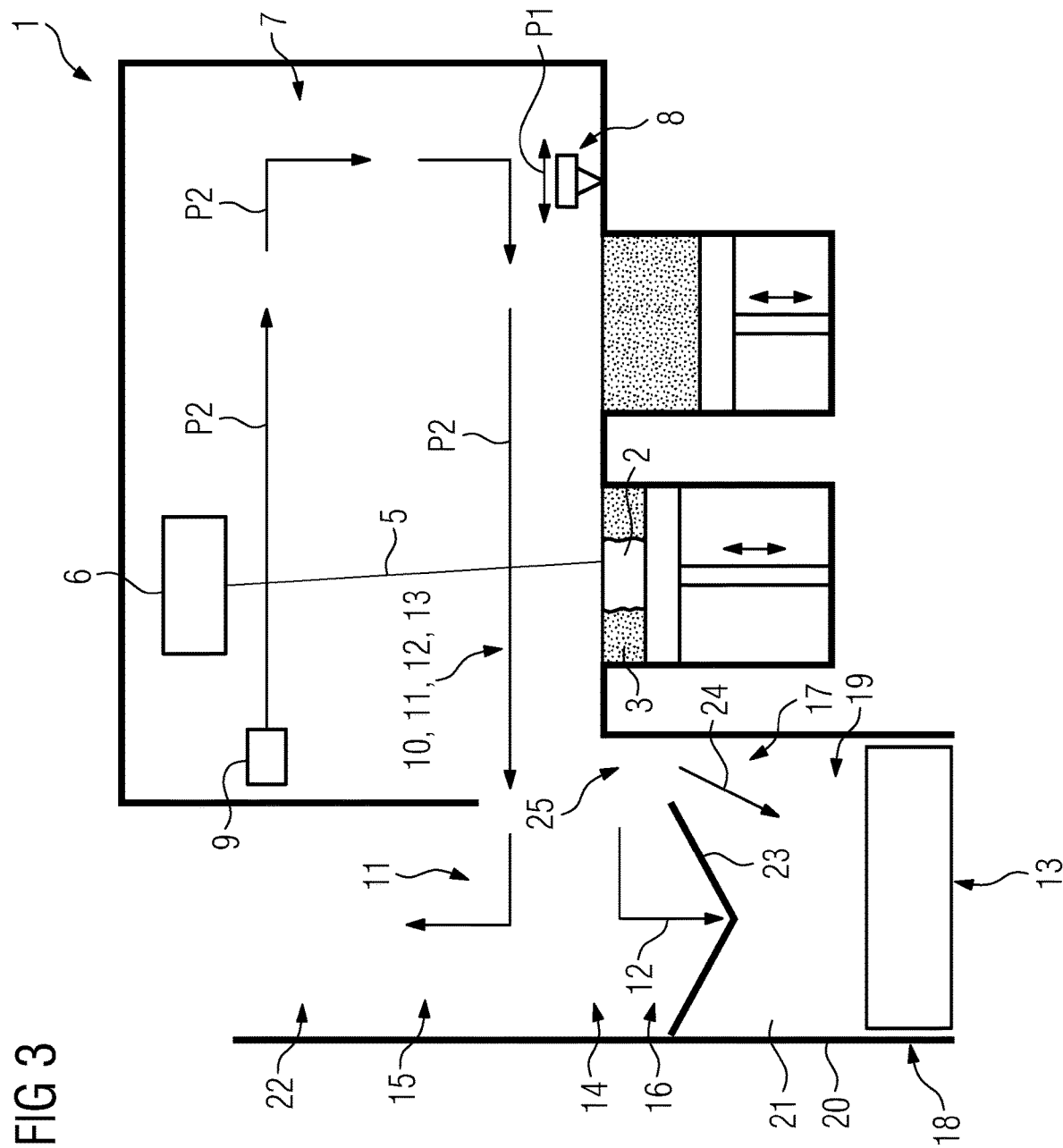

FIG. 3 shows a schematic diagram of an apparatus 1 according to another exemplary embodiment. In contrast to the exemplary embodiments according to FIG. 1, 2, here the separation element 23 has, cross-sectionally seen, a V-shaped angled geometric structural design. Also with the V-shaped angled geometric design a pocket-like collecting section for construction material particles of the second construction material particle fraction 12 to be separated is defined.

Figure 4:
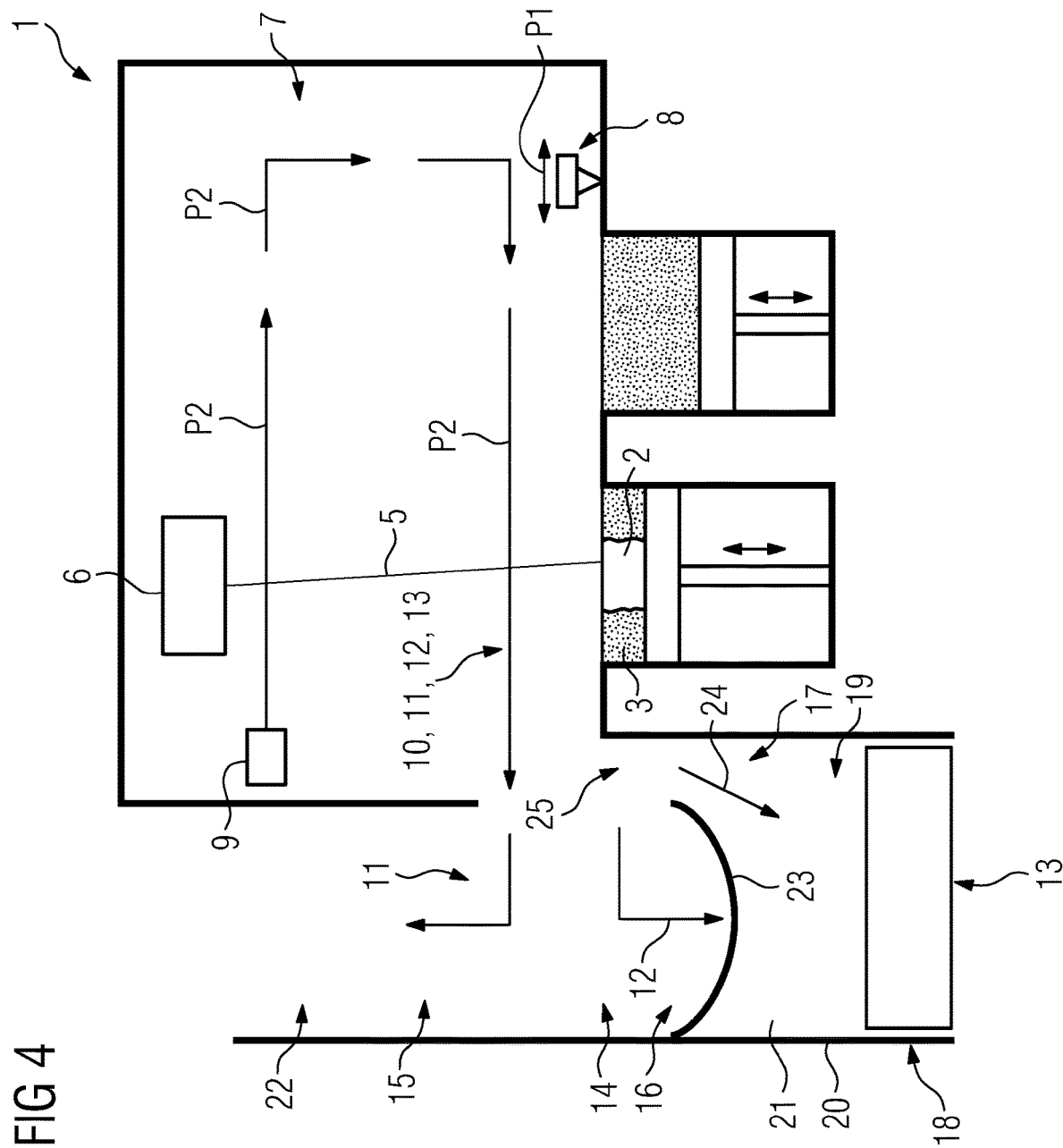

FIG. 4 shows a schematic diagram of an apparatus 1 according to another exemplary embodiment. In contrast to the exemplary embodiments according to FIG. 1-3, here the separation element 23 has, cross-sectionally seen, a curved geometric structural design. Also with the curved geometric design a pocket-like collecting section for construction material particles of the second construction material particle fraction 12 to be separated is defined.

With the apparatuses 1 shown in the exemplary embodiments a method for additive manufacturing of three-dimensional components 2 by successive, selective layer-by-layer exposure and thus solidifying construction material layers of a construction material 3 that can be solidified by means of an energy beam 5 in a process chamber 7, wherein the process chamber 7 is flown through by an, especially inert, gas flow generated by a flow generation device 9, wherein with the gas flow and construction material particles resulting related to the process a particle mixture 10 is formed, wherein the particle mixture 10 includes at least three construction material fractions 11-13 differing in at least one construction material particle parameter, especially particle size or particle density can be implemented. The method is characterized in that for separating the respective construction material particle fractions 11-13 from the particle mixture 10 a separation device 14 is used, which is provided for separating the respective construction material particle fractions 11-13 from the particle mixture 10 by means of visual inspection, wherein the separation device 14 comprises at least three separation sections 15-17 each serving the separation of a certain construction material particle fraction 11-13.

The invention claimed is:

1. An apparatus for additively manufacturing three-dimensional components, the apparatus comprising:
a process chamber;
a flow generation device configured to cause a stream of gas to flow through the process chamber, the stream of gas collecting construction material particles from the process chamber;
a separation device configured to receive the stream of gas after having collected the construction material particles from the process chamber, wherein the separation device comprises:
a powder module comprising one or more powder chamber walls defining a powder chamber and a separation element extending into the powder chamber from at least one of the one or more powder chamber walls with a gap defined between an upstream portion of the separation element and an upstream portion of the one or more powder chamber walls relative to a lateral direction of the stream of gas flowing from the process chamber into the separation device; and
a vertically oriented flow channel defining a first separation section disposed above the separation element, wherein the separation element defines a second separation section occupying an upper portion of the powder chamber, and wherein the gap defines a pathway into a third separation section occupying a lower portion of the powder chamber below the separation element;
wherein when the stream of gas flows from the process chamber into the separation device, a first construction material particle fraction and a second construction material particle fraction flow with the stream of gas past the gap and a third construction material particle fraction enters into the third separation section by way of the gap, and the first construction material particle fraction flows with the stream of gas into the vertically oriented flow channel and enters into the first separation section and the second construction material particle fraction enters into the second separation section.

2. The apparatus of claim 1, wherein:
the first construction material particle fraction has a particle size distribution below a lower limit for particle size, and/or a particle density distribution below a lower limit for particle density; and/or
the second construction material particle fraction has a particle size distribution above the lower limit for particle size and below an upper limit for particle size, and/or a particle density distribution above the lower limit for particle density and below an upper limit for particle density; and/or
the third construction material particle fraction has a particle size distribution above the upper limit for particle size, and/or a particle density distribution above the upper limit for particle density.

3. The apparatus of claim 1, comprising:
a coating device configured to form construction material layers, wherein the powder module defines a collector or overflow module configured to receive construction material overflow when forming the construction material layers with the coating device.

4. The apparatus of claim 1, comprising:
a filter device connected downstream of the vertically oriented flow channel, the filter device configured to separate the first construction material particle fraction from the stream of gas.

5. The apparatus of claim 1, wherein the separation element is movably supported in at least one freedom degree of motion relative to at least one of the one or more powder chamber walls and/or relative to a bottom of the powder chamber.

6. The apparatus of claim 1, comprising:
an additional flow generation device configured to generate a transport flow influencing the flow of at least the second construction material particle fraction in the direction of the second separation section.

7. The apparatus according to claim 5, wherein a span of the gap can be varied by movement of the separation element relative to the at least one of the one or more powder chamber walls and/or relative to the bottom of the powder chamber.

8. The apparatus of claim 6, wherein the transport flow generated by the additional flow generation device is configured to influence the flow of at least the second construction material particle fraction over the gap.

9. A method of additively manufacturing three-dimensional components, the method comprising:
selectively solidifying successive layers of a construction material through layer-by-layer exposure to an energy beam in a process chamber; and
generating a stream of gas with a flow generation device and flowing the stream of gas through the process chamber and into a separation device, the stream of gas collecting construction material particles from the process chamber, and the separation device configured to receive the stream of gas comprising the construction material particles from the process chamber, wherein the separation device comprises:
a powder module comprising one or more powder chamber walls defining a powder chamber and a separation element extending into the powder chamber from at least one of the one or more powder chamber walls with a gap defined between an upstream portion of the separation element and an upstream portion of the one or more powder chamber walls relative to a lateral direction of the stream of gas flowing from the process chamber into the separation device; and
a vertically oriented flow channel defining a first separation section disposed above the separation element, wherein the separation element defines a second separation section occupying an upper portion of the powder chamber, and wherein the gap defines a pathway into a third separation section occupying a lower portion of the powder chamber below the separation element;
wherein when the stream of gas flows from the process chamber into the separation device, a first construction material particle fraction and a second construction material particle fraction flow with the stream of gas past the gap and a third construction material particle fraction enters into the third separation section by way of the gap, and the first construction material particle fraction flows with the stream of gas into the vertically oriented flow channel and enters into the first separation section and the second construction material particle fraction enters into the second separation section.

10. The method of claim 9, wherein:
the first construction material particle fraction has a particle size distribution below a lower limit for particle size, and/or a particle density distribution below a lower limit for particle density; and/or
the second construction material particle fraction has a particle size distribution above the lower limit for particle size and below an upper limit for particle size, and/or a particle density distribution above the lower limit for particle density and below an upper limit for particle density; and/or
the third construction material particle fraction has a particle size distribution above the upper limit for particle size, and/or a particle density distribution above the upper limit for particle density.

11. The method of claim 9, comprising:
forming construction material layers with a coating device; and
collecting construction material overflow with the powder module when forming the construction material layers with the coating device.

12. The method of claim 9, comprising:
separating the first construction material particle fraction from the stream of gas with a filter device connected downstream of the vertically oriented flow channel.

13. The method of claim 9, comprising:
moving the separation element relative to at least one of the one or more powder chamber walls and/or relative to a bottom of the powder chamber, the separation element being movably supported in at least one freedom degree of motion relative to the at least one of the one or more powder chamber walls and/or relative to the bottom of the powder chamber.

14. The method of claim 9, comprising:
generating with an additional flow generation device, a transport flow influencing the flow of at least the second construction material particle fraction in the direction of the second separation section.

15. The method of claim 13, comprising:
varying a span and/or length of the gap by movements of the separation element relative to the at least one of the one or more powder chamber walls and/or relative to the bottom of the powder chamber.

16. The method of claim 14, comprising:
influencing the flow of at least the second construction material particle fraction over the gap with the transport flow from the additional flow generation device.

* * * * *